United States Patent [19]

Christensen et al.

[11] Patent Number: 5,751,942

[45] Date of Patent: May 12, 1998

[54] TRACE EVENT DETECTION DURING TRACE ENABLE TRANSITIONS

[75] Inventors: Reed K. Christensen; Robert W. Martell, both of Hillsboro, Oreg.

[73] Assignee: Intel Corporation, Santa Clara, Calif.

[21] Appl. No.: 647,387

[22] Filed: May 9, 1996

Related U.S. Application Data

[63] Continuation of Ser. No. 85,645, Jun. 30, 1993, abandoned.

[51] Int. Cl.⁶ .............................. G06F 11/00; G06F 9/45
[52] U.S. Cl. ................ 395/183.14; 395/704; 395/183.1; 395/183.11; 395/183.15; 395/183.21
[58] Field of Search ..................... 395/183.1, 183.11, 395/183.14, 183.15, 183.21; 364/267–267.91

[56] References Cited

U.S. PATENT DOCUMENTS

| | | | |
|---|---|---|---|
| 4,635,193 | 1/1987 | Moyer et al. | 395/375 |
| 4,802,165 | 1/1989 | Ream | 371/19 |
| 5,265,254 | 11/1993 | Blasciak et al. | 395/700 |
| 5,313,616 | 5/1994 | Cline et al. | 395/500 |
| 5,359,608 | 10/1994 | Belz et al. | 371/16.5 |

OTHER PUBLICATIONS

Robert L. Kruse, "Data Structures and Programming Design", 1987, pp. 22–26.

*Primary Examiner*—Robert W. Beausoliel, Jr.
*Assistant Examiner*—P. Vales
*Attorney, Agent, or Firm*—Blakey, Sokoloff, Taylor & Zafman

[57] ABSTRACT

A method and apparatus for providing trace fault information to a trace fault handler. The trace fault information is evaluated prior to beginning execution of a micro code flow. The evaluated trace fault information is stored in a buffer and the micro code flow is executed. While the micro code flow is executing, if a micro code instruction of the micro code flow is executed that enables tracing, the trace fault information stored in the buffer is written to a data storage area. The data storage area is accessible to the trace fault handler.

14 Claims, 5 Drawing Sheets

TRACE CONTROL REGISTERS 400

| | |
|---|---|
| TRACE ENABLE | 405 |
| TRACE FAULT PENDING | 410 |
| INSTRUCTION MODE | 415 |
| BRANCH MODE | 417 |
| CALL MODE | 420 |
| RETURN MODE | 422 |
| PRE RETURN MODE | 425 |
| SUPERVISOR MODE | 427 |
| MARK / FMARK MODE | 430 |
| INSTRUCTION EVENT | 432 |
| BRANCH EVENT | 435 |
| CALL EVENT | 437 |
| RETURN EVENT | 440 |
| PRE RETURN EVENT | 442 |
| SUPERVISOR EVENT | 445 |
| MARK / FMARK EVENT | 447 |
| IP BRKPT 0 | 450 |
| IP BRKPT 1 | 455 |
| TLB DA BRKPT EVENT | 460 |
| XLAT FLT IP | 465 |
| SEL MEM 1 | 470 |
| CONST | 475 |
| SERIAL BRANCH | 480 |
| BRANCH READY | 485 |
| REG IPBP 0 | 490 |
| REG IPBP 1 | 495 |

*Figure 4*

TRACE EVENT DETECTION DURING TRACE ENABLE TRANSITIONS

This is a Continuation Application of application Ser. No. 08/085,645, filed Jun. 30, 1993, now abandoned.

BACKGROUND OF THE INVENTION

1. Field of the Invention

The present invention relates to the field of testing and debugging computer systems, in particular, microprocessor based computer systems. More specifically, the present invention relates to testing and debugging using in-circuit emulation or a software debugger.

2. Art Background

Microprocessor based computer systems are well known and widely available. Generally, the heart of a microprocessor system is a single integrated circuit (IC) chip that contains a processor. Typically, after going through a bootstrap initialization process, the processor reads, decodes and executes a stream of instructions that together form a program or process. Usually, the process is stored in random access memory (RAM) or read only memory (ROM) that is external to the processor chip.

Reduced instruction set computing (RISC) processors are becoming well known and widely available. A RISC processor executes RISC instructions sequentially. RISC instructions are macro instructions specified by the user in a program or process. If a macro instruction cannot be executed as a single RISC instruction, the macro instruction will cause a string or flow of micro code instructions associated with the macro code instruction to execute. Then, the next macro code instruction will execute. The micro code instruction strings associated with a macro code instruction are typically stored in ROM in a micro code cache that resides on the processor chip.

Prototype hardware and system software for a microprocessor system are often tested and debugged using a secondary auxiliary processor (host system) that monitors and controls the prototype system under test (target system). The host system is also known as an in-circuit emulator or development system. Additionally, if the operating software of the target system is not sufficiently functional to permit a local debugger to execute on the target system, testing and debugging are performed using a remote debugger on the host system.

In order for the host system to be able to monitor and control the target system, the host system must be able to stop the target system, inspect or modify the processor and system state, and then allow the target system to resume normal operation. More specifically, the host system typically will be able to:

a) stop the processor of the target system, b) inspect the registers and memory locations of the target system to determine the state of the target system, c) provide a command or instruction to the processor of the target system for execution, d) modify the registers and memory locations of the target system, e) alter the program counters of the target system to resume program execution on the target system at a different location than the location the target system relinquished control to the host system, f) enable tracing and set trace break points to halt the target system and return control to the host system upon the occurrence of a particular condition, and g) cause the target system to resume normal operation.

Traditionally, additional pins are provided to the pin-out of the processor chip or a special version of the processor chip of the target system, to allow the host system to be connected to the target system and to perform the monitor and control functions described above. The host system stops the target system by asserting a break signal on one or more of the additional pins of the processor chip. Upon receiving the break signal, the processor chip generally completes the instruction that it is currently executing and then execute of the user code and awaits further instructions from the host system.

Typically, if the host system enables tracing and sets a trace break point, trace logic resident on-board the processor chip will monitor the execution of the processor and, upon the occurrence of a particular condition associated with the trace break point, cause a trace fault event to occur. The trace fault event is generally triggered by the execution of a macro code instruction. For example, break points can be set to occur: on the execution of a particular macro code instruction, on the execution of a particular type of macro code instruction or when a macro code instruction accesses a particular memory location.

A function similar to in-circuit emulation is also performed by a software debugger trace handler. In the case of the software debugger, there is no need for a host system. Instead, a software debugging program that is similar to any other user program is typically stored on a random access device such as a hard drive in the same way that a user program would be stored. Typically, the software debugger is executed and a user program to be debugged is specified. The software debugger then controls the execution of the user program to be executed. In this way, the software debugger permits a user to stop the target system, inspect or modify the processor and system states, and then allow the target system to resume normal operation. Thus, a user can employ a software debugger to perform directly from the target system the same functions as those of in-circuit emulation.

Occurrence of a trace event will cause the target system to stop execution of the user code and cause a trace fault handler to turn control of the target system over to the host system or the software debugger. Generally, when tracing has been enabled, on-board tracing logic will maintain trace information that is stored in trace control registers on-board the processor. The trace information is used by the trace handler or the host system to determine the particular trace event that occurred and to determine the next instruction to be executed by the processor when the host returns control to the processor.

One class of powerful macro code instructions that can be developed by invoking micro code flows can switch the execution environment of the program being executed. This change of environment can invoke or disable tracing. If a macro code instruction executes that invokes a micro code instruction flow that enables tracing, the trace fault information, traditionally evaluated upon execution of a macro code instruction, will not have been evaluated. Therefore, the trace fault handler or host system will not have available to them the trace information that they need.

SUMMARY OF THE INVENTION

A method and apparatus for providing trace fault information to a trace fault handler is described. The trace fault information is evaluated prior to beginning execution of a micro code flow. The evaluated trace fault information is stored in a buffer and the micro code flow is executed.

While the micro code flow is executing, if a micro code instruction of the micro code flow is executed that enables tracing, the trace fault information stored in the buffer is written to a data storage area. The data storage area is accessible to the trace fault handler.

BRIEF DESCRIPTION OF THE DRAWINGS

The objects, features, and advantages of the method and apparatus of the present invention will be apparent from the following detailed description of the invention in which:

FIG. 4 illustrates trace control registers used by one embodiment of a processor that can detect trace events during execution of a micro code flow that causes a trace enable transition.

DETAILED DESCRIPTION OF THE INVENTION

A method and apparatus for implementation of trace event detection during trace enable transactions is disclosed. The method and apparatus of the present invention has particular application to testing and debugging of microprocessor based computer systems.

In the following description, for purposes of explanation, specific numbers, materials and configurations are set forth in order to provide a thorough understanding of the present invention. It will be apparent to one skilled in the art, however, that the present invention may be practiced without these specific details. In other instances, well known systems are shown in diagrammatic or block diagram form in order not to obscure the present invention unnecessarily.

Figure 1:
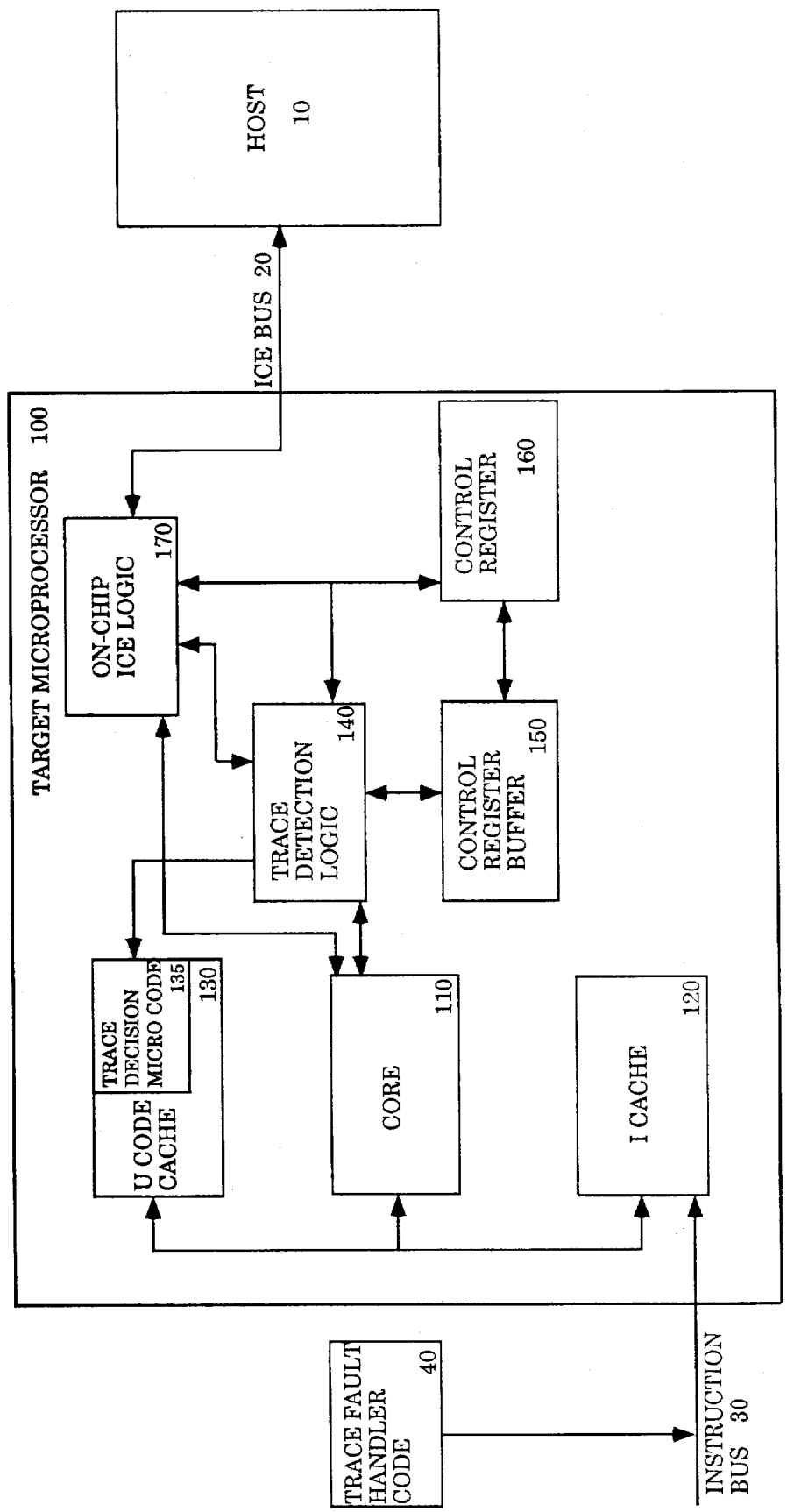
FIG. 1 illustrates a microprocessor based computer system that includes an external in-circuit emulator processor.

Referring now to FIG. 1, a microprocessor based target system is shown coupled to a host system so that in-circuit emulation (ICE) can be performed. In FIG. 1, external in-circuit emulator 10 (the host system) is coupled to processor 100 (the target system) by in-circuit emulation bus 20. Host 10 can be a general purpose computer such as a personal computer. Alternately, host 10 can be a dedicated processor developed specifically for providing in-circuit emulation.

The heart of processor 100 is core 110. Core 110 is where code is executed. Core 110 has an instruction decoder, an execution unit and a register file. In one embodiment, processor 100 is a reduced instruction set computing (RISC) processor. As such, processor 100 executes RISC instructions that are macro instructions, sequentially. If a macro instruction cannot be executed as a single RISC instruction, it will cause a string of micro code instructions to execute. Then, the next macro code instruction will execute.

As can be seen in FIG. 1, macro code instructions enter processor 100 through instruction bus 30 and are stored in instruction cache 120 until they are required by core 110. If one of the macro code instructions requires micro code, the micro code is retrieved by core 110 from micro code ROM cache 130.

On-chip ICE logic 170 resides on target microprocessor 100 and is coupled to host system 10 by ICE Bus 20. On-chip ICE logic 170 receives in-circuit emulation commands from host system 10, and provides information to host system 10 in response to the ICE commands or in response to the occurrence of trace events. ICE logic 170 can also control core 110 in response to ICE commands that it receives from host system 10. For example, upon receipt of a break command from host system 10, ICE Logic 170 will order core 110 to stop executing user code upon completion of execution of any instruction that it is currently executing.

On-chip ICE Logic 170 is also coupled to trace detection logic 140. Trace detection logic 140 is coupled to core 110 so that trace detection logic 140 can monitor the occurrence of trace events as instructions are executed by core 110. For example, the occurrence of a branch instruction may require a branch event bit of FIG. 4 (described below) to bet set. Trace detection logic 140 is also coupled to control register 160. Control register 160 contains trace information used by trace detection logic 140 to keep track of the occurrence of trace events and to determine the next macro code instruction to be executed by core 110 when execution of the user code continues. Trace detection logic 140 is also coupled to micro code cache 130. In this way, when trace detection logic 140 detects a trace event, trace decision micro code 135 is retrieved from micro code cache 130 to core 110 so that it may be executed. Control register 160 is also coupled to on-chip ICE logic 170 so that, upon the occurrence of a trace event during in-circuit emulation, on-chip ice logic 170 can provide trace fault information to host system 10 after trace decision micro code 135 has executed and turned control of target processor 100 over to host 10.

Alternately, trace detection logic 140 can be used by software debugger trace fault handler code 40 to debug software in much the same manner as would be performed using in-circuit emulation by host system 10. When a break set by trace fault handler code 40 is detected by trace detection logic 140, the trace decision micro code 135 would be invoked and would determine that, rather than in-circuit emulation, software debugging was being performed. Therefore, instead of turning control of target processor 100 over to host system 10, code instructions from trace fault handler code 40 would be executed by core 110 until trace fault handler code 40 ordered target processor 100 to continue execution of the software being debugged.

Just as host 10 can be used in a system that does not have software debugger trace fault handler code 40, software debugger trace fault handler 40 can be used in a system that does not include host 10. It is also possible to use host system 10 and software debugger trace fault handler 40 in the same system. The latter case could be accomplished, for example, by having trace decision micro code 135, upon detection of a trace fault, test a value stored in control register 160. The value in control register 160 could be set by host 10 and by software debugger 40, and would be used by trace decision micro code 135 to determine whether to turn control of processor 100 over to host 10 or software debugger 40.

Trace detection logic 140 is also coupled to control register buffer 150. When tracing is not enabled, trace detection logic 140 loads control register buffer 150 with trace information that would be stored in control register 160 if tracing were enabled. Then, if a macro code instruction is executed in core 110 that causes the execution of a micro code flow that enables tracing, trace detection logic 140 will sense the enabling of the tracing. Upon sensing the enabling of the tracing, trace detection logic 140 will cause the trace information stored in control register buffer 150 to be written to control register 160. In this way, the trace information will be available in control register 160 when it is required by trace fault handler code 40 or by host system 10.

The contents of control register 160 are accessible by host system 10 and by trace fault handler code 40, and hence visible to the user performing in-circuit emulation or software debugging. The contents of control register buffer 150, however, are not visible to the user. In this way, control register buffer 150 permits trace information to be available when needed because tracing was enabled by a micro code instruction flow, while, at the same time, hiding trace information from the user when tracing is not enabled. Therefore, the storing of erroneous information in control register 160 is avoided because trace information is only stored in control register 160 when tracing is enabled.

Figure 2:
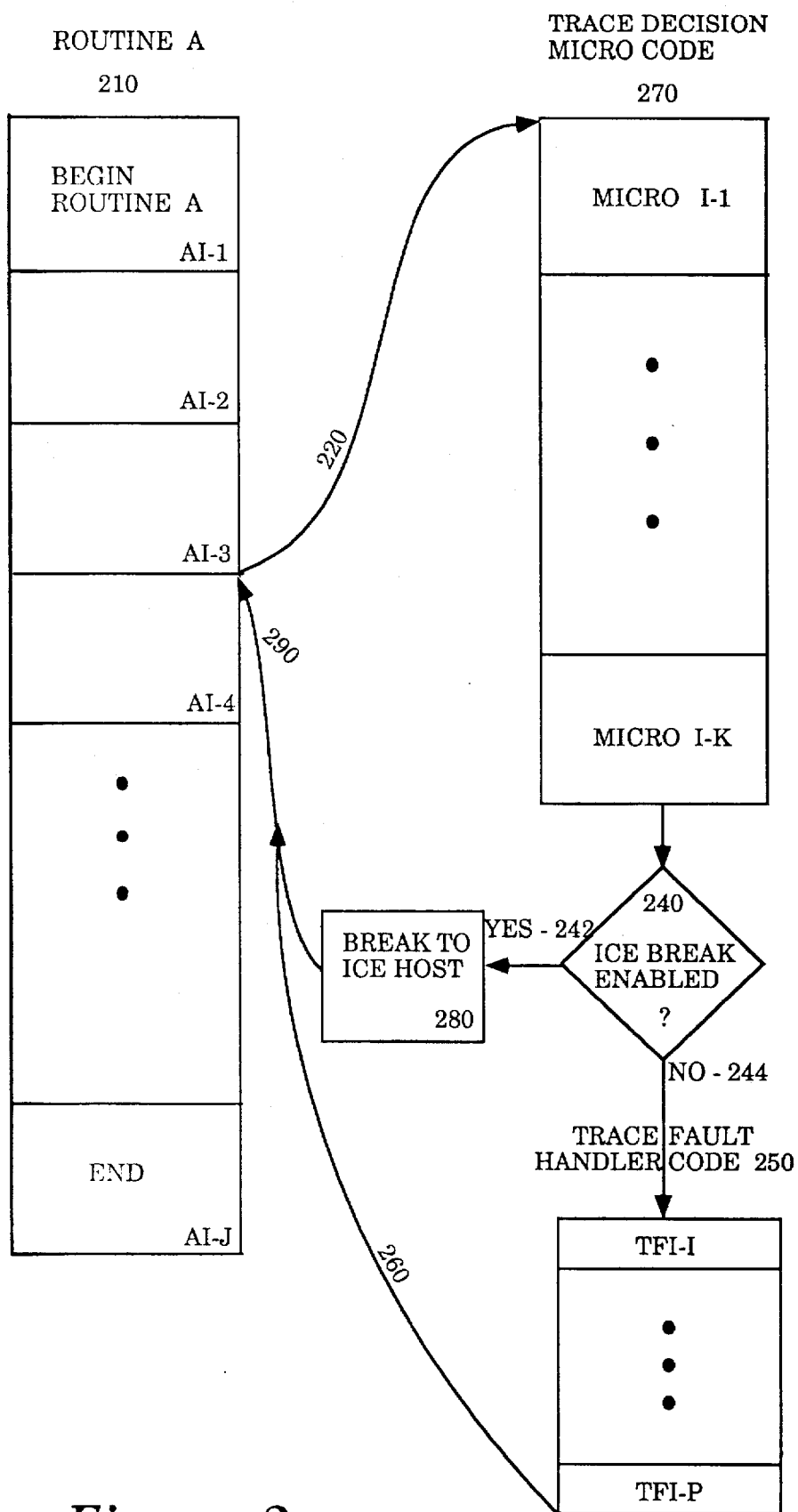
FIG. 2 illustrates a trace event reaction with a subsequent return.

Referring now to FIG. 2, a trace event reaction with a subsequent return is illustrated. In FIG. 2, Routine A 210 is shown to be a series of macro code instructions that begins with macro code instruction AI-1 and ends with macro code instruction AI-J. The macro code instructions are executed sequentially by the target system core until instruction AI-3 is executed whereupon a trace event occurs.

The trace event associated with user instruction AI-3 could have occurred for many reasons. For example, an instruction pointer break point could have been set so that when the instruction stored at the memory location address of instruction AI-3 was executed an instruction pointer break event would occur. Alternately, instruction AI-3 could be an instruction that accesses a memory location that has a data access break point set thereby causing a data access event to occur whenever that memory location is accessed.

It is also possible that an instruction type break point has been set. Thus, for example, if a break on branch has been set, and instruction AI-3 is a branch instruction, a branch break event will occur when instruction AI-3 executes.

Furthermore, it is possible that the break was caused by some reason not specific to instruction AI-3, and instruction AI-3 was simply the instruction that was being executed when the break occurred. For example, the break could have been caused by a break command sent from the host system that was received as instruction AI-3 was being executed.

Moreover, it is possible that the break could have been caused by a combination of reasons. For example, an instruction pointer break could have been set for instruction AI-3, and instruction AI-3 could also be an instruction that accesses a memory location that has a data access break set.

Regardless of the cause of the trace break, instruction AI-3 will complete execution and then the processor will stop executing instructions of routine A 210. As illustrated by arrow 220, control will then be transferred to the trace decision micro code 270. Trace decision micro code 270 is a series of micro code instructions (MICRO I-1 through MICRO I-K) that are used to determine the type of trace event that occurred and provide control of the target system to the host system or to the trace fault handler code 250. In decision block 240 a test is made to determine whether an ICE break has been enabled. If the ICE break has been enabled, then decision path 242 will be taken to process block 280 and a break to host 10 will occur. Then, when host 10 returns control of processing to processor 100, execution of routine A 210 will resume with the execution of instruction AI-4 as shown by arrow 290. Instruction AI-4, is the next instruction to execute in routine A after instruction AI-3 executed. The target system will then continue execution of instructions in Routine A 210 until the routine ends at instruction AI-J.

Referring again to decision block 240, if the ICE break has not been enabled, then decision path 244 will be taken to trace fault handler code 250 and software debugging using trace fault handler code 250 executing in core 110 will occur. Then, when trace fault handler code 250 returns control of processing to processor 100, execution of routine A 210 will also resume with the execution of instruction AI-4 as shown by arrows 260 and 290.

Figure 3:
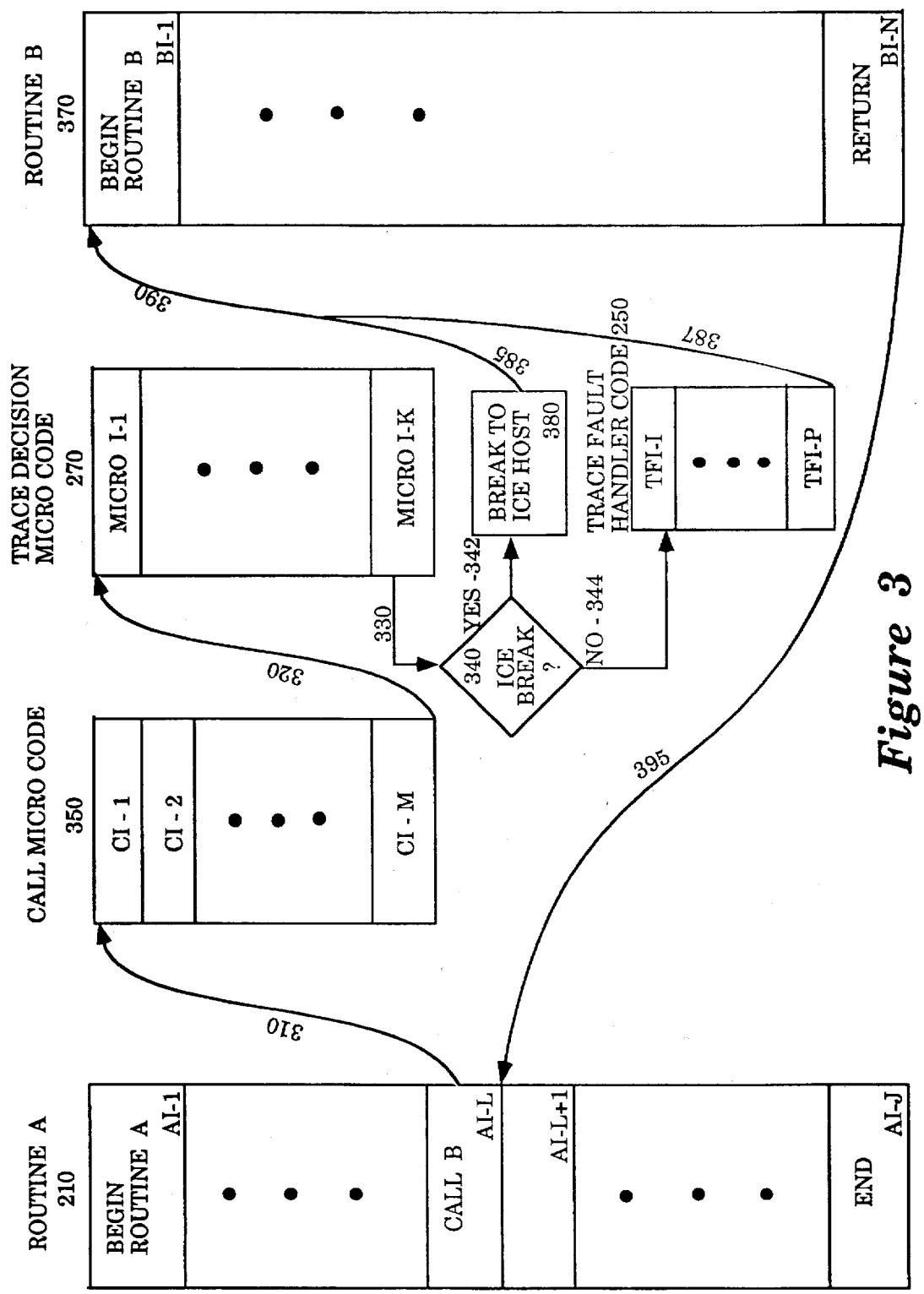
FIG. 3 illustrates a trace event detection during a trace enable transition.

Referring now to FIG. 3, trace event detection during a trace enable transition is depicted. In FIG. 3, the instructions of Routine A 210 are executed sequentially by the target system until the target system executes instruction AI-L. In this example, instruction AI-L is a macro instruction that is a call to sub-Routine B 370. Normally, a call to a routine causes the processor to suspend execution of the instructions of the calling routine and execute an instruction sequence that is the called routine. Upon completion of execution of the called routine, a return is made to the calling routine and the instruction of the calling routine that immediately follows the call instruction is executed.

In FIG. 3, as illustrated by arrow 310, the macro code call instruction AI-L causes execution of call micro code 350 (a micro code sequence of instructions CI-1 through CI-M). The micro code sequence of call micro code 350 changes the execution environment from that of the calling routine to that of the called routine so that the called routine can be executed. In so doing, it may be the case that, although tracing was not enabled in the environment for the calling routine (i.e., Routine A 210), tracing is to be enabled in the environment of the called routine (i.e., Routine B 370). Thus, if this is the case, execution of one of the micro code instructions of call micro code 350 will cause tracing to be enabled. Then, because tracing will have been enabled, trace decision micro code 270 will be invoked as shown by arrow 320 and executed prior to execution of Routine B 370. Thus, as represented by arrow 330 a test is made in decision block 340 to determine whether an ICE break has been enabled. If the ICE break has been enabled, then decision path 342 will be taken to process block 380 and a break to host 10 will occur. Then, when host 10 returns control of processing to processor 100, execution of routine B 370 will begin with the execution of instruction BI-1 as shown by arrows 385 and 390. Routine B 370 will execute and then, upon completion of execution of Routine B 370, processing will return to instruction AI-L+1 (as depicted by arrow 395).

Referring again to decision block 340, if the ICE break has not been enabled, then decision path 344 will be taken to trace fault handler code 250 and software debugging using trace fault handler code 250 executing in core 110 will occur. Then, when trace fault handler code 250 returns control of processing to processor 100, execution of routine B 370 will resume with the execution of instruction BI-1 as shown by arrows 387 and 390.

Because tracing was not enabled when macro code instruction AI-L initiated the call micro code 350, the trace information required by trace decision micro code 270 would not have been evaluated and stored in the trace control register. When macro code instruction AI-L was executed, however, the trace information is evaluated and stored in a buffer by the trace detection logic even though tracing is not enabled. Then, when tracing is enabled due to the change of environment during execution of call micro code 350 from the environment of Routine A 210 to the environment of Routine B 370, the trace detection logic will cause the trace information stored in the buffer to be written to the trace control register so that it will be available when trace decision micro code 270 executes.

Referring now to FIG. 4, trace control registers of one embodiment of a fault mechanism for a superscalar processor are depicted. The trace control registers depicted in FIG. 4 are presented to provide representative examples of trace control registers. Because the processor is a superscalar processor, it is able to group up to three macro code instructions together and execute them simultaneously. Some of the trace control registers of FIG. 4 are used by a serialization algorithm executed by the trace decision micro code 270 to serialize instructions of multiple instruction sets when a trace event occurs while executing one or more of the instructions of a set of instructions. Details of the serialization algorithm appear in U.S. patent application Ser. No. 08/085,508, entitled "Precise Fault Mechanism for Superscalar Processor Architectures", Reed K. Christensen and André Eberhard Wolper, filed Jun. 30, 1993.

In FIG. 4, all of the registers are single bit registers with the exception of registers XLAT FLT IP 465, REG IPBP 0 490, and REG IPBP 1 495. Register XLAT FLT IP 465 is used by the trace decision micro code to calculate the instruction pointer locations for each instruction in a faulting instruction group. Register IPBP 0 490 is used to store an instruction pointer memory address upon which an instruction pointer break has been set. If a second instruction pointer break is set, then the instruction pointer memory address for the second instruction pointer break point is stored in register IPBP 1 495.

Trace enable bit 405 is set by the host system or trace fault handler code. When trace enable bit 405 is set, the trace fault mechanism will operate. If there is no need for in-circuit emulation or software debugging, the trace enable bit 405 will not be set and the trace fault mechanism will be disabled.

Trace fault pending bit 410 is set by the trace logic when a trace fault is encountered. Setting of the trace fault pending bit 410 invokes trace decision micro code 270 to handle the pending trace fault.

Instruction, branch, call, return, pre-return, supervisor and mark/fmark mode bits 415, 417, 420, 422, 425, 427 and 430, respectively, are set by the host processor or software debugger and control the mode of the trace fault mechanism. If instruction mode bit 415 is set, the superscalar capability of the target processor is disabled and only one instruction is executed at a time. After each instruction is executed, instruction event bit 432 will be set thereby notifying trace fault handler 40 that the instruction has executed. If tracing is enabled and the branch mode bit 417 is set, branch event bit 435 will be set and a trace fault break will occur whenever a branch instruction is executed. Similarly, whenever tracing is enabled and call mode bit 420 is set, call event bit 437 will be set and a trace fault break will occur whenever a call instruction is encountered. If tracing is enabled and return mode bit 422 is set, return event bit 440 will be set and a trace fault break will occur whenever a return from a called routine has occurred. If tracing is enabled and pre-return mode bit 425 is set, pre-return event bit 442 will be set and a trace fault break will occur prior to a return from a called routine. If tracing is enabled and supervisor mode bit 427 is set, supervisor event bit 445 will be set and a trace fault break will occur whenever the process enters the supervisor mode during an execution environment change. A mark/fmark event occurs when a user instruction has an explicit invocation of the trace fault handler. If tracing is enabled and mark/fmark mode bit 430 is set, mark/fmark event bit 447 will be set and a trace fault break will occur whenever a mark/fmark has occurred. If tracing is enabled and an instruction pointer memory address has been stored in register IPBP 0 490, event bit IP BKRKPT 0 450 will be set and a trace fault break will occur whenever the instruction stored at the instruction pointer memory address stored in register IPBP 0 490 has been executed. Similarly, if tracing is enabled and an instruction pointer memory address has been stored in register IPBP 1 495, event bit IP BKRKPT 1 455 will be set and a trace fault break will occur whenever the instruction stored at the instruction pointer memory address stored in register IPBP 1 495 has been executed. Finally, the TLB DA break point event flag 460 is set when the translation look-aside buffer discovers that a data break point was set for a data location that is being accessed.

Register bits SEL MEM1 470, const 475, serial branch 480 and branch ready 485 contain the information of the issue template of the superscalar processor. In this architecture, up to three instructions can be executed in parallel. The instructions are separated into three types: REG, MEM, and BOP. REG instructions are register-to-register instructions such as adds, subtracts, or moves. MEM instructions are load and store types of instructions. BOPs are branch operations. Table 1 sets forth the possible issue templates and corresponding values of the SEL MEM1, const, serial branch and branch ready bits for the embodiment being described. It is possible for a MEM type instruction to be two words long. In Table 1, MEM designates the first word of the MEM type instruction and DIS signifies the second word.

It can be seen from Table 1 that, in the superscalar processor being described, no instruction cluster can contain more than one instruction of a given type. Furthermore, if an instruction contains a REG type instruction, it must be the first instruction in the cluster. Also, if an instruction in cluster contains a BOP type instruction, it must be the last instruction in the cluster.

TABLE 1

| SEL MEM1 | CONST | SERIAL BRANCH | BRANCH READY | INSTRUCTIONS ISSUED | | |
|---|---|---|---|---|---|---|
| | | | | W0 | W1 | W2 |
| — | — | 1 | 1 | BOP | | |
| 0 | 0 | 0 | 0 | REG | | |
| 0 | 0 | 0 | 0 | MEM | | |
| 0 | 1 | 0 | 0 | MEM | DIS | |
| 0 | 0 | 0 | 1 | REG | BOP | |
| 1 | 0 | 0 | 0 | REG | MEM | |
| 1 | 0 | 0 | 0 | REG | MEM | DIS |
| 0 | 0 | 0 | 1 | MEM | BOP | |
| 0 | 1 | 0 | 1 | MEM | DIS | BOP |
| 1 | 0 | 0 | 1 | REG | MEM | BOP |

From Table 1 it can also be seen that the serial branch 480 bit is only set when a branch operation, and no other operation, is issued in an instruction group. If an instruction group includes a branch operation, the branch ready 485 bit is set. If an instruction group includes both a register and a memory instruction, then the SEL MEM1 bit 470 is set. Finally, the const bit 475 is set when the issue template includes a double word memory instruction, but does not also include a register instruction.

Figure 5:
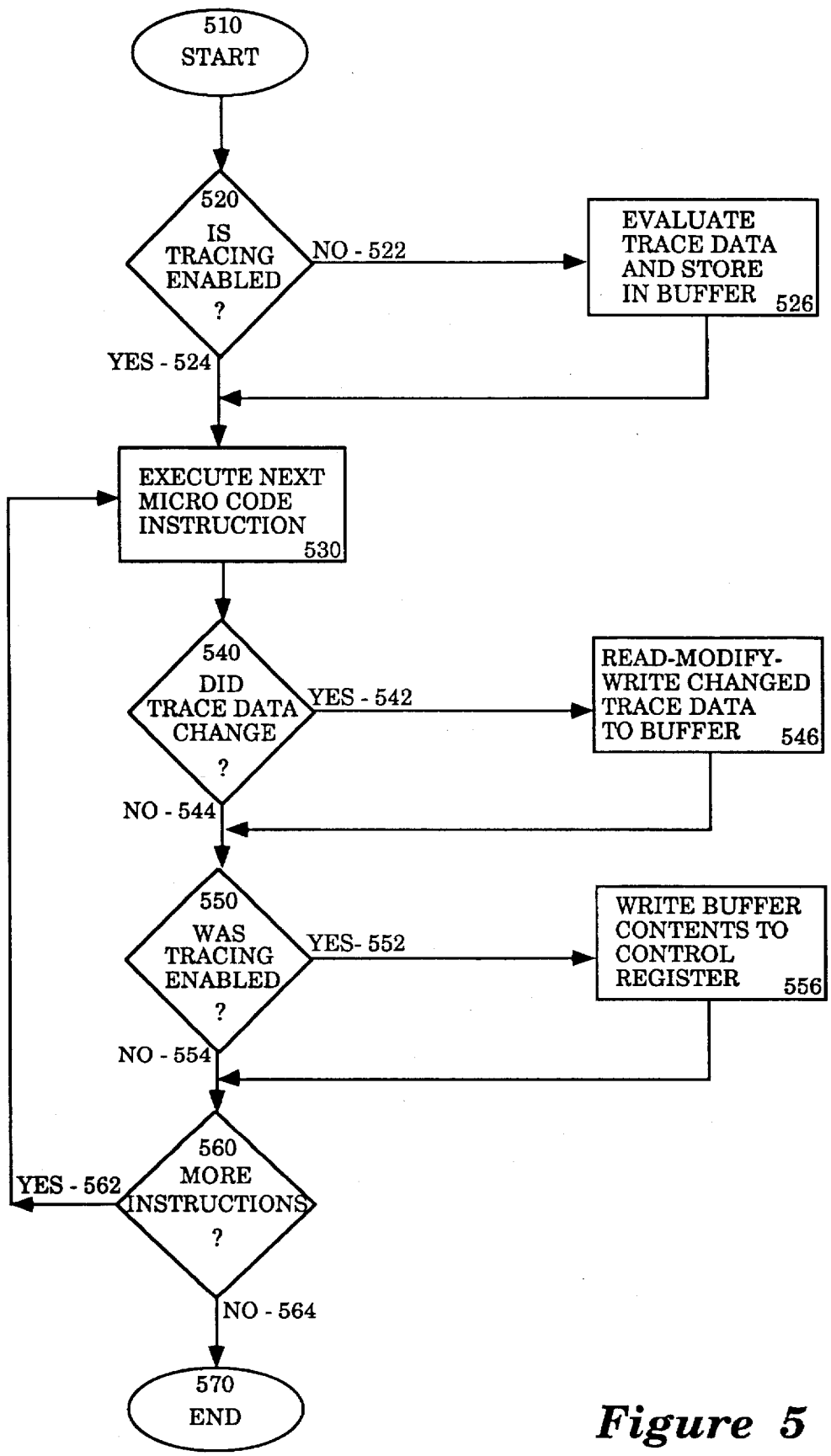
FIG. 5 illustrates a flow chart of a micro code flow that causes a trace enable transition.

Referring now to FIG. 5, a flow chart of a micro code flow that can cause a trace enable transition is illustrated. The micro code flow of FIG. 5 will start at start bubble 510, in one embodiment, when a macro code instruction of the target processor causes the micro code flow to be invoked. In decision block 520, a test is performed to determine whether tracing is enabled. If tracing has not been enabled, then decision path 522 is taken to process block 526 where the trace data is evaluated and stored in the buffer. The test of decision block 520 and process of process block 526 can be performed by micro code instructions. Alternately, the function can be implemented in hardware and invoked whenever a macro code instruction causes a micro code instruction flow to occur.

In process block 530, a single micro code instruction is executed by the target system. If the micro code instruction flow has just begun, the micro code instruction executed in process block 530 will be the first micro code instruction in the micro code instruction flow. If, however, one or more micro code instructions of the micro code instruction flow have already been executed, then the next micro code instruction to be executed of the micro code instruction flow will be executed in process block 530.

It is possible that execution of a micro code instruction in process block 530 will cause one or more values of the trace data to change. Therefore, upon execution of a micro code instruction in process block 530, a test is performed in decision block 540 to determine whether the micro code instruction that executed has caused a need for the trace data stored in the trace data buffer to be updated. If the trace data must be updated, then decision path 542 is taken from decision 540 to process block 546 where the trace data in the buffer is updated.

In one embodiment, the trace data buffer is updated to reflect the change in the trace data by reading the trace data buffer contents, modifying the values read to reflect the change in trace data and then writing the updated data back to the buffer. In this embodiment, the read-modify-write procedure is used to ensure that only the data changed by execution of the last micro code instruction will be modified.

Alternately, if there is no danger that information in the buffer will be lost, in process block 546, all of the trace data information can be re-evaluated and then written to the buffer.

Referring now to decision block 550, a test is made to determine whether execution of the micro code instruction in process block 530 caused tracing, that was previously not enabled, to become enabled. If this is the case, then decision path 552 is taken to process block 556 where the contents of the buffer are written to the control register.

A test is then made in decision block 560 to determine whether there are more instructions in the micro code flow. If there are more instructions in the micro code flow, then decision path 562 is taken to process block 530 where the next micro code instruction of the micro code flow is executed. If, on the other hand there are no more instructions in the micro code flow, then decision path 564 is taken to terminal bubble 570 where the micro code instruction flow terminates.

Although FIG. 5 has been shown to perform the tests of decision block 540, 550 and 560 after execution of each micro code instruction, this was done for didactic purposes. Typically, micro code flows are written to accomplish a particular function. When the micro code instruction flow is written, it is possible to determine whether a particular micro code instruction of the micro code flow is the last micro code instruction of the micro code flow, or will have the potential to cause trace data to change or tracing to be enabled. If a particular micro code instruction does none of these things, there will be no need to perform the tests of decision block 540, 550 and 560 after the instruction is executed and processing can proceed immediately to the next micro code instruction of the micro code flow.

Alternately, the tests of decision block 540 and 550, and the processes of process block 546 and 556 can be implemented in hardware rather than by micro code instructions.

Referring again to process block 556, in the event that the buffer contents are written to the control register, it may be necessary to ensure that additional micro code instructions occur before the micro code flow ends. This is to ensure that sufficient time will elapse to permit the buffer contents to be stored in the control register before they are needed at the termination of the micro code flow.

Although the method and apparatus of the present invention has been described in terms of its presently preferred and alternate embodiments, those skilled in the art will recognize that the present invention may be practiced with modification and alternation within the spirit and scope of the appended claims. The specifications and drawings are, accordingly, to be regarded in an illustrative rather than a restrictive sense.

What is claimed is:

1. A method for testing one of software and an electronic device, the method comprising the steps of:

monitoring for an occurrence of a trace event during execution of macro code instructions prior to execution of a plurality of micro code instructions;

determining whether or not tracing has been enabled;

storing the trace information in a buffer inaccessible to a trace fault decision handler if tracing has been disabled and the trace event has occurred;

executing the plurality of micro code instructions; and while the plurality of micro code instructions are executing, if one of the plurality of micro code instructions enabling tracing is executed, writing the trace information stored in the buffer to a data storage area, the data storage area being accessible to the trace fault decision handler.

2. The method as set forth in claim 1, prior to the monitoring step, the method further comprising the step of:

setting at least one mode bit of a control register in accordance with a type of instruction associated with the trace event.

3. The method as set forth in claim 1 further comprising the step of:

while the plurality of micro code instructions are executing, if tracing is not enabled and a micro code instruction of the plurality of micro code instructions that changes the trace information is executed, updating the trace information stored in the buffer.

4. The method as set forth in claim 3 wherein the trace information that changed is updated in the buffer through the use of a read-modify-write operation so that trace information that did not change is not affected.

5. An apparatus for providing trace information to a trace fault decision handler for testing one of software and hardware, the apparatus comprising:

detection means for checking for an occurrence of a trace event during execution of macro code instructions prior to beginning execution of a plurality of micro code instructions;

buffer means for temporarily storing the trace information for use if tracing is initially disabled, said buffer means being coupled to said detection means;

execution means for executing said plurality of micro code instructions;

data storage means for storing the trace information for use by the trace fault decision handler when tracing is enabled; and trace enable sensing means for writing the trace information stored in the buffer means to the data storage area if a first micro code instruction of the plurality of micro code instructions, which enables tracing after said detection means previously detected that tracing was disabled, is executed, said trace enable sensing means being coupled to said execution means, said buffer means and said data storage means.

6. The apparatus as set forth in claim 5, wherein the trace event is associated with one of a branch, a call and a return.

7. The apparatus as set forth in claim 5 further comprising:

updating means for updating the trace information stored in the buffer means if (i) tracing is not enabled and a second micro code instruction of the plurality of micro code instructions that changes the trace information is executed, said updating means being coupled to the detection means and the buffer means.

8. The apparatus as set forth in claim 7 wherein the trace information that changed is updated in the buffer means through the use of a read-modify-write operation so that trace information that did not change is not affected.

9. An apparatus for providing trace information to a trace fault decision handler in order to test software or an electronic device, the apparatus comprising:

a trace detection logic configured to monitor for an occurrence of a trace event during execution of macro code instructions prior to beginning execution of a plurality of micro code instructions;

a buffer coupled to the trace detection logic, said buffer is inaccessible to the trace fault decision handler and temporarily contains the trace information when tracing is disabled;

a core circuit configured to execute the plurality of micro code instructions;

a data storage element to contain the trace information for use by the trace fault decision handler when tracing is enabled; and a trace enable sensor coupled to the core circuit, the buffer and the data storage element, to write the trace information stored in the buffer to the data storage element, if a micro code instruction of the plurality of micro code instructions that enables tracing when tracing is disabled is executed.

10. A system for performing debugging operations, the system comprising:

an external debugger; and a processor including execution means for executing a micro code flow, detection means for checking for an occurrence of a trace event during execution of macro code instructions by the processor prior to beginning execution of the micro code flow to determine whether or not tracing has been enabled, said detection means being coupled to said execution means, buffer means for containing the trace information if tracing is not enabled, said buffer means being coupled to said executing means and is inaccessible to said external debugger, trace fault decision means, for providing control of the execution means by the external debugger upon completion of execution of the micro code flow if tracing was enabled during execution of the micro code flow, said trace fault decision means being coupled to said execution means and said external debugger, data storage means for containing the trace information for use by the trace fault decision means when tracing is enabled, said data storage means being coupled to said trace fault decision means, and trace enable sensing means for writing the trace information stored in the buffer means to the data storage means if a micro code instruction of the micro code flow that enables tracing when tracing is not enabled is executed, said tracing enable sensing means being coupled to said execution means, said buffer means and said data storage means.

11. The system as set forth in claim 10, wherein said processor further comprises:

updating means for updating the trace information stored in the buffer means if tracing is not enabled and a micro code instruction of the micro code flow that changes the trace information is executed, said updating means is coupled to the execution means and the buffer means.

12. The system as set forth in claim 11 wherein the trace information that changed is updated in the buffer means through the use of a read-modify-write operation so that trace information that did not change is not affected.

13. The system as set forth in claim 10 wherein the external debugger is a host system for performing in-circuit emulation.

14. The system as set forth in claim 10 wherein the external debugger is a trace fault handler code for performing software debugging.

* * * * *

UNITED STATES PATENT AND TRADEMARK OFFICE
CERTIFICATE OF CORRECTION

PATENT NO.    : 5,751,942
DATED         : May 12, 1998
INVENTOR(S)   : Christensen et al.

It is certified that error appears in the above-identified patent and that said Letters Patent is hereby corrected as shown below:

Column 2,
Line 11, delete "execute" and insert -- executes --.

Column 8,
Line 28, delete "duster" and insert -- cluster --.

Signed and Sealed this

Eighth Day of April, 2003

JAMES E. ROGAN
*Director of the United States Patent and Trademark Office*